United States Patent [19]

Parr et al.

[11] 3,873,820

[45] Mar. 25, 1975

[54] APPARATUS FOR CHECKING PARTIAL PRODUCTS IN ITERATIVE MULTIPLY OPERATIONS

[75] Inventors: Joseph Ward Parr, Derwood; Kwang Yue Sih, Potomac, both of Md.

[73] Assignee: International Business Machines Corporation, Armonk, N.Y.

[22] Filed: Jan. 31, 1974

[21] Appl. No.: 438,511

[52] U.S. Cl. .......................................... 235/153 BD

[51] Int. Cl. .......................................... G06f 11/10

[58] Field of Search ............. 235/153 BD, 168, 175

[56] References Cited

UNITED STATES PATENTS

| | | | |
|---|---|---|---|
| 3,098,994 | 7/1963 | Brown, Jr. | 235/153 BD |
| 3,659,089 | 4/1972 | Payne et al. | 235/153 BD |
| 3,814,923 | 6/1974 | Wang | 235/153 BD |

OTHER PUBLICATIONS

Sih & Reinheimer, Checking Logical Operations by Residues, IBM Technical Disclosure Bulletin, Vol. 15, No. 7, December, 1972, pp. 2325–2327.

*Primary Examiner*—Charles E. Atkinson
*Attorney, Agent, or Firm*—John W. Henderson, Jr.

[57] ABSTRACT

Apparatus for detecting multiplication errors in digital computers where multiplication is executed by iterative addition. A predicted residue is generated for each iteration by modifying the residue of the previous partial product according to the multiplier bits in the current iteration and the multiplicand residue. The current partial product is obtained and its residue generated. The generated current partial product residue is compared to the predicted residue for the current iteration to determine whether a hardware error has occurred. The process is repeated for each iteration, thereby eliminating the possibility of offsetting errors.

5 Claims, 5 Drawing Figures

FIG. 2

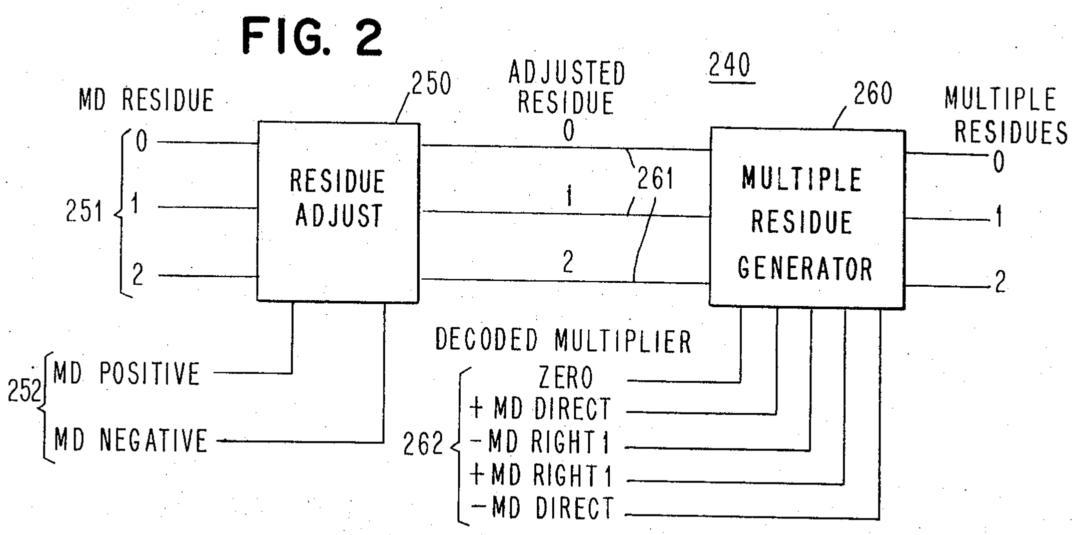

FIG. 4

| DECODED MULTIPLIER BITS | MULTIPLE | HOT ONE |
|---|---|---|
| 0 0 0 | LOAD ZERO DIRECTLY INTO CSA-A | 0 |
| 0 0 1 | SHIFT + MD RIGHT 1 BIT INTO CSA-A | 0 |
| 0 1 0 | SHIFT + MD RIGHT 1 BIT INTO CSA-A | 0 |
| 0 1 1 | LOAD + MD DIRECTLY INTO CSA-A | 0 |
| 1 0 0 | LOAD - MD DIRECTLY INTO CSA-A | 1 |
| 1 0 1 | SHIFT - MD RIGHT 1 BIT INTO CSA-A | 1 |
| 1 1 0 | SHIFT - MD RIGHT 1 BIT INTO CSA-A | 1 |
| 1 1 1 | LOAD ZERO DIRECTLY INTO CSA-A | 0 |

TABLE 1 MULTIPLE GENERATOR

FIG. 5

| MULTIPLICAND RESIDUE | | MULTIPLE RESIDUES | | | | |
|---|---|---|---|---|---|---|
| MD POSITIVE | MD NEGATIVE IN TWO'S COMPLEMENT | LOAD ZERO DIRECTLY INTO CSA-A | LOAD + MD DIRECTLY INTO CSA-A | SHIFT - MD RIGHT 1 BIT INTO CSA-A | SHIFT + MD RIGHT 1 BIT INTO CSA-A | LOAD - MD DIRECTLY INTO CSA-A |
| 0 | 1 | 0 | 0 | 0 | 0 | 0 |
| 1 | 2 | 0 | 1 | 1 | 2 | 2 |
| 2 | 0 | 0 | 2 | 2 | 1 | 1 |

TABLE 2 MULTIPLE RESIDUE GENERATOR

APPARATUS FOR CHECKING PARTIAL PRODUCTS IN ITERATIVE MULTIPLY OPERATIONS

BACKGROUND OF THE INVENTION

1. Field of the Invention

This invention relates to methods and apparatus for checking hardware malfunctions in the multiply unit of digital computers and more particularly to the detection of calculation errors due to such hardware malfunctions.

2. Prior Art

Many applications of digital computers require not only that the machine be fast but also that it be highly reliable. The industry has improved reliability tremendously with advances in the component state of the art. However, since totally reliable components have not yet evolved, improved error detection techniques provide a practical alternative. One source of vulnerability to computational errors is the multiply unit. Multiplication is usually accomplished in digital computers by an algorithm utilizing iterative addition. The circuitry necessary to implement the iterative addition multiply algorithm is complex and the multiply operation may require many iterations through this circuitry increasing the probability of computational error due to hardware failure. It has been found to be highly desirable to monitor the multiply operation in order to detect computational error due to such hardware failures.

Residue techniques have often been employed in order to detect errors in the multiply unit of digital computers. A detailed description of residue arithmetic is disclosed by Walter Hoffman, et al., in "Method and Apparatus for Performing Arithmetical Operations in the System of Residual Classes", U.S. Pat. No. 3,167,645, filed Dec. 8, 1960, and assigned to the same assignee as this application.

One known method for detecting errors in the multiply unit of a digital computer sought to take advantage of the residue method by utilizing an overall residue check, e.g., modulo 3. A predicted residue for the product is generated by the following steps: (a) generating the residues of the multiplier and multiplicand, (b) multiply the residues together, (c) generate the residue of their product. The residue of the product of the residues of the multiplier and multiplicand, i.e., the predicted residue, is then compared to the residue of the actual product after the multiply operation is executed to determine if a hardware error has occurred during the multiply operation.

However, generation of the final product may require many iterations through the multiply algorithm loop and the overall residue check may not detect all single hardware failures. For example, when a single failure in the loop results in several errors in the final product or when the errors generate a residue of zero, i.e., the predicted and generated residues agree, the error will not be detected by the overall residue check.

One method to diminish the possibility of undetected single hardware errors in the multiply unit is to perform a residue check after each iteration through the multiply loop. Where the multiply algorithm operates on the multiplicand in accordance with one bit of the multiplier during each iteration, the predicted residue of the partial product may be determined as follows: (a) generate the residue of the previous partial product and the residue of the current addend, i.e., the multiplicand in accordance with the current multiplier bit, (b) the residues together, (c) generate the residue of their sum. The residue of the sum of the previous Partial Product and the current addend is then compared to the residue of the actual current Partial Product after execution of the current iteration to determine if a hardware error has occurred during the current iteration.

The above described method for detecting hardware malfunctions in the multiply unit of a digital computer utilizing an iterative addition algorithm is operable so long as the iterative addition algorithm retires only one multiplier bit per iteration. However, in response to the ever present demand for increased operating speeds, iterative addition multiply algorithms have been developed which retire a plurality of multiplier bits during each iteration. One such algorithm is disclosed in U.S. Pat. No. 3,515,344, filed Aug. 31, 1966 by R. E. Goldschmidt, et al., entitled "Apparatus for Accumulating the Sum of a Plurality of Operands," and assigned to the same assignee as this application. The multiplier disclosed by Goldschmidt, et al., is capable of retiring $6x$ multiplier bits per iteration, where $x = 1, 2, 3, \ldots, n$. The multiplier bits are decoded such that x multiplier bits equal one decoded bit and the multiplicand is shifted into a series of 3-input carry-save adders (CSA) in accordance with the decoded bit. Since the CSA requires three inputs and each input is determined by $x$ multiplier bits (one decoded bit), $6x$ multiplier bits are retired each iteration by the CSA's in the multiply unit.

This type of multiply unit may be checked for errors by using the aforementioned overall residue check since the multiplier and multiplicand are available prior to execution of the multiply operation. However, as previously stated the overall residue check may not detect all single failures. The Partial Products can not be checked for errors due to hardware failure during each iteration through the multiply loop by known residue methods because the residue of the decoded mutliplier bits does not follow known rules for residue determination.

OBJECTS OF THE INVENTION

An important object of this invention is to detect errors in the Partial Products in an iterative multiply operation due to hardware failures where the multiply unit retires a plurality of multiplier bits during each iteration.

Another important object of the invention is to detect errors due to hardware failure in an improved manner without degradation of the multiply unit.

SUMMARY OF THE INVENTION

In accordance with the present invention, an error detection circuit is employed which checks the Partial Products of the multiply operation for errors during each iteration in a system where the multiply unit retires a plurality of decoded multiplier bits during each iteration. The error detection is accomplished by generating a predicted residue for the current iteration based on the multiples presented to the CSA adder loop in the multiply unit as a result of decoding a plurality of multiplier bits in the multiplication operation and the accumulated previously predicted Partial Product residue. Simultaneously with the generation of the predicted residue, the multiply unit generates the current Partial Product in the CSA adder loop. Residue generation apparatus then generates the residues of the sum and carry from the CSA loop which are added to the residue of the spill sums from previous iterations in order to determine the actual residue of the current Partial Product. The actual residue is then compared to the predicted residue and an error signal is generated if the residues are not equal.

The final product for the multiply operation is accumulated in a carry propagate adder which combines the carry and sum outputs from the CSA loop plus the spill sums. Generation of the actual residue and comparison to the predicted residue are accomplished simultaneously with accumulation in the carry propagate adder so as not to degrade the performance of the multiply unit.

BRIEF DESCRIPTION OF THE DRAWINGS

FIG. 2 is a block diagram representation of the multiple residue generator used to generate the predicted residue.

FIG. 4 shows the possible combinations of decoded multiplier bits and the corresponding shifts and/or sign changes of the multiplicand (MD) made in the multiply apparatus to which checking apparatus is connected.

FIG. 5 shows a determination of the multiple residue by the checking apparatus in accordance with the multiplicand shifts performed by the multiply apparatus.

DESCRIPTION OF THE PREFERRED EMBODIMENT

Figure 1:
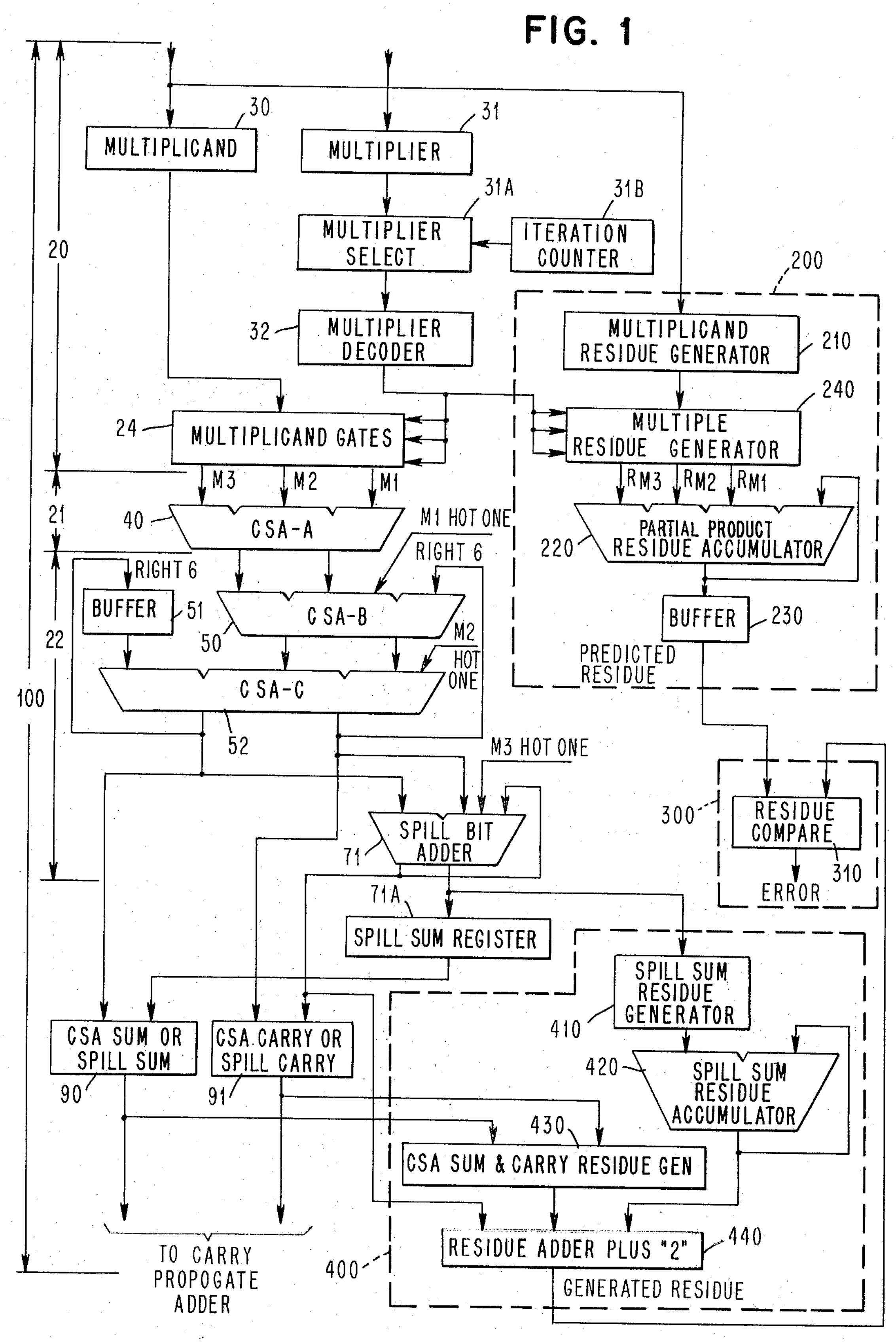
FIG. 1 is a block diagram representation of the checking apparatus connected to a six bit per iteration multiply unit.

The apparatus of the preferred embodiment of this invention is herein described in connection with a multiply unit which is substantially similar to the multiply unit disclosed by Goldschmidt, et al., U.S. Pat. No. 3,515,344, entitled "Apparatus for Accumulating the Sum of a Plurality of Operands," filed Aug. 31, 1966, assigned to the same assignee as this invention and hereby incorporated herein by reference. FIG. 1 shows a block diagram of the residue predictor 200, actual residue generator 400 and residue comparator 300 in connection with a Goldschmidt multiply unit 100. For simplicity of description the Goldschmidt multiply unit 100 is shown in its simplest form wherein six bits of the multiplier are retired during each iteration through the adder. The above referenced Goldschmidt patent should be referred to for a detailed description of the operation of the Goldschmidt multiply unit 100 since only a working description will be presented herein.

Still referring to FIG. 1, the multiply unit 100 includes an operand input means 20, and adder tree 21, and adder loop 22, and a parallel carry propagate adder not shown. The operand input means 20 includes a multiplicand source 30, and multiplier source 31, a multiplier bit selector 31A, an iteration counter 31B, a multiplier decoder 32 and multiple gates 24. The multiple gates 24 comprise a plurality of gating devices whereby a plural binary bit operand can be gated through the devices to the input of adder tree 21. The multiplier select 31A is utilized to scan the multiplier bits and to energize multiplier decoder 32 during each iteration. The iteration counter 31B energizes the multiplier select 31A in accordance with system timing to initiate the scanning of multiplier bits stored in multiplier source 31 by the multiplier select 31A. On each iteration, 7 bits of the multiplier are examined and utilized to energize the multiplier decoder 32. On the first iteration, the multiplier select 31A is capable of transferring the first 7 bits of the multiplier to the decoder 32 from the multiplier source 31. From then on the multiplier select 31A gates succeeding groups of 7 multiplier bits to the decoder 32 in a overlapping technique such that only 6 new bits are brought into the decoder 32. On each iteration of the multiply operation, the multiplier decoder 32 will produce signals effective at multiple gates 24 to gate the multiplicand (MD) from multiplicand source 30 through the gates 24 shifted by a proper amount and/or made negative to reflect the multiple of MD dictated by the multiplier bits examined to produce at the adder tree input multiples of MD designated in FIG. 1 as M1 through M3. As in the Goldschmidt multiplier, the multiples M1 through M3 must contain some sign extension bits due to a characteristic of the CSA loop. Two sign extension bits are required in the preferred embodiment described herein. The group of signal lines labelled M1 through M3 are the multiples of the MD which are presented as operand inputs to the adder tree 21 to provide an ultimate output representing the product of the MD and multiplier bits examined. The multiplier bits are examined by the multiplier decoder 32 in overlapping groups of 3 bits in order to determine the proper amount of shift and the sign for the MD to be gated through the gates 24. In this way the high order multiplier bit from each iteration becomes the low order bit for the succeeding iteration and 6 bits of the multiplier are retired during each iteration. A summary of the multiply unit decoding technique is shown in Table 1 of FIG. 4.

The residue predictor 200 of the error checking apparatus of the current invention operates in connection with the multiply unit input means 20 as shown in FIG. 1 to produce a predicted residue for the Partial Product generated during each iteration through the multiply unit 100. The residue predictor 200 comprises a multiplicand residue generator 210 whose input is connected to the multiplicand source 30, a multiple residue generator 240 receiving input signals from the multiplicand residue generator 210 and the multiplier decoder 32, a multiple residue accumulator 220 connected in a feedback configuration with inputs from the multiple residue generator 240 and a buffer 230 receiving input signal from the multiple residue accumulator.

The multiplicand residue generator 210 operates to generate the residue, e.g., modulo 3, of the MD by conventional residue techniques. For example, see G. L. Glapper, "Determination of a Modulo-3 Residue," IBM Technical Disclosure Bulletin, Vol. 12, No. 7, page 953, December 1969. Although it is understood that this invention will operate equally well in any modulo system, modulo 3 was chosen for discussion of the preferred embodiment.

FIG. 2 shows a more detailed block diagram of the multiple residue generator 240. It is the function of the multiple residue generator 240 to receive inputs from the multiplicand residue generator 210 and the multiplier decoder 32 and to generate a predicted residue for the multiples M1 through M3 based on the received inputs. The Partial Product residue generator 240 comprises a residue adjust 250 and a residue generator 260. It is the function of the residue adjust 250 to adjust the residue for a negative MD such that the system operates only on positive residues. When operating with modulo 3 residues, it is well understood that 3 may be added to any residue without changing the result since adding 3 to a residue is equivalent to adding zero. Therefore, a negative residue may be converted to its positive equivalent modulo 3 by adding 3. Since negative numbers are represented in two's complement form in the multiply unit, it is only necessary to adjust the residue of negative MD by 2 in order to obtain its modulo 3 positive equivalent. Therefore, the residue adjust 250 logically adjusts the residue of negative MD in accordance with the "multiplicand residue" columns of Table 2 in FIG. 5.

Still referring to FIG. 2 and Table 2 in FIG. 5, the residue generator 260 accepts the adjusted MD residue from residue adjust 250 at input lines 261 and the decoding information for the multiples M1 through M3 from the multiplier decoder 32 at input lines 262. The residue generator 260 logically combines the adjusted MD residue and the multiple decoding information to determine the residue of the multiples M1 through M3 in accordance with Table 2 in FIG. 5.

Figure 3:
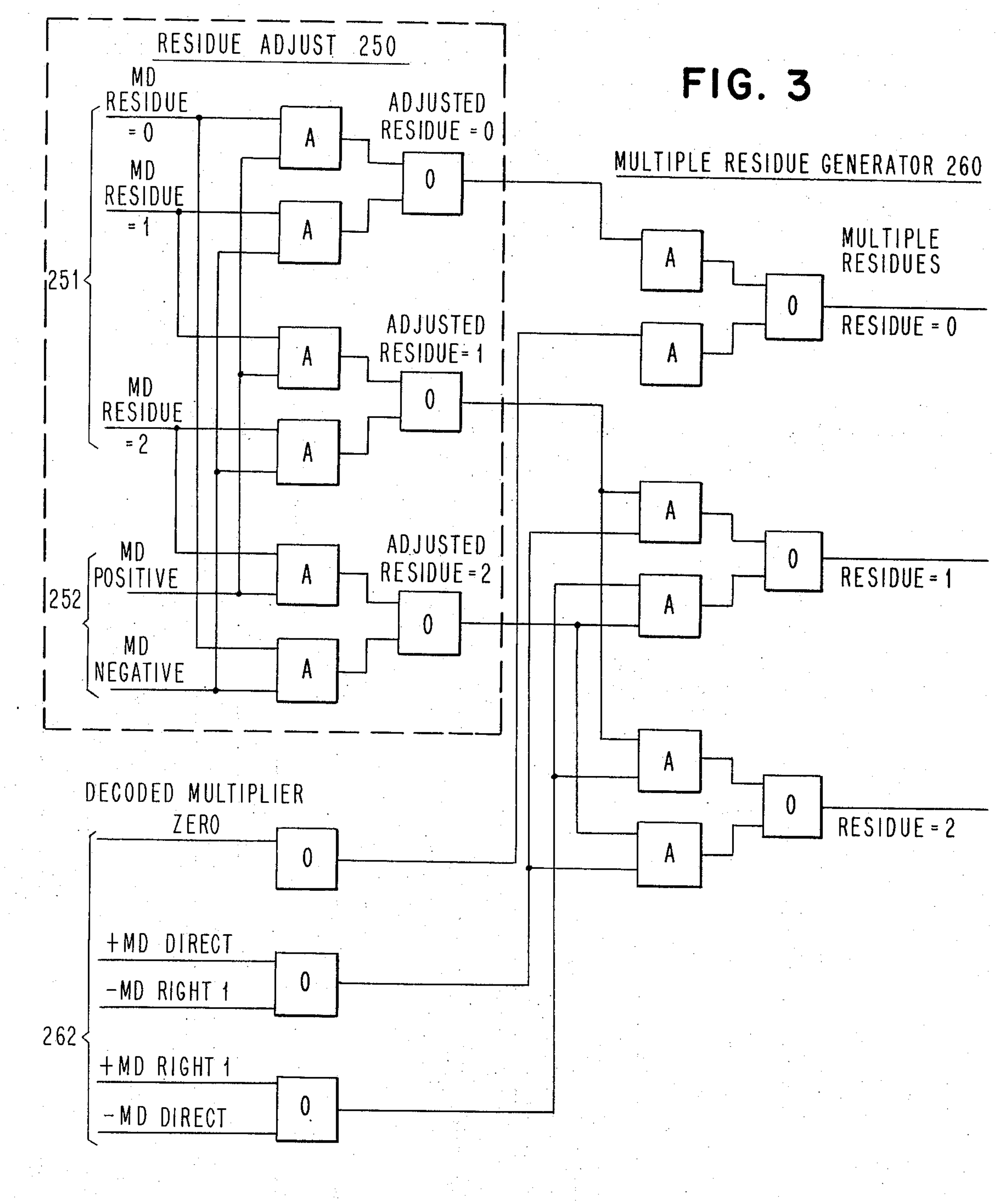
FIG. 3 is the logic necessary to implement the multiple residue generator of FIG. 2.

FIG. 3 shows a detailed implementation of the Partial Product residue generator 240 implemented in combinational logic. While the preferred embodiment of the Partial Product residue generator 240 is shown implemented in AND and OR logic, it is well known to those skilled in the art that the functions can be implemented in some other form of logic, e.g., NOR, without changing the scope of the invention.

As can be seen in FIG. 1, the inputs to the Partial Product residue generator 240 from the multiplier decoder 32 comprises three sets of lines, one line for each of the multiples M1 through M3. Correspondingly the Partial Product residue generator 240 comprises three sets each of the residue adjust 250 and the residue generator 260 circuitry. The residues generated, $R_{M1}$ through $R_{M3}$, for the multiples M1 through M3 are propagated to the multiple residue accumulator 220. The residue accumulator 220 adds the residues modulo 3 of $R_{M1}$ through $R_{M3}$ to the predicted residue for the previous iteration in order to determine the predicted residue for the current iteration. This predicted residue is then delayed in buffer 230 until the completion of the current iteration in the multiply unit and generation of the actual residue of the current partial product.

Concurrent with generation of the predicted residue by the residue predictor 200, the multiply unit 100 executes the current iteration through its apparatus to determine the current Partial Product. The adder tree 21, comprised of carry-save adder 40 (CSA–A) receives at its input groups of signal lines representing all of the bits of the multiples M1 through M3 passed through multiple gates 24. The output of the adder tree is two groups of signal lines representing the sum and carry of the multiples M1 through M3. The number of carry-save adders in the adder tree is determined by the number of multiplier bits to be retired during each iteration. In the embodiment of the multiply unit shown herein, 6 multiplier bits are retired during each iteration and since 2 multiplier bits are decoded into 1 bit in the Goldschmidt decoding scheme, a three input adder tree is required to retire the 6 bits. The number of CSA's required in the adder tree can be shown to be N–2, where N is the number of inputs to the adder tree.

The adder loop 22 is comprised of a first and second stage of CSA's, the first stage of the adder loop being comprised of a carry-save adder 50 designated CSA–B. The second or final stage of the adder loop 22 is comprised of a carry-save adder 52 designated CSA–C. It is the function of the adder loop 22 to receive successive outputs from the adder tree 21 at the same time as two groups of output signal lines are produced by CSA–C. In addition to the outputs of adder tree 21, the adder loop 22 also receives feedback from the carry output of CSA–C and a HOT ONE for multiple M1 at the input of CSA–B. The function of the HOT ONE is to convert a negative MD to two's complement form as required for the decoding scheme used by Goldschmidt and shown in Table 1 of FIG. 4. Whenever the decoded multiplier bits are 100, 101, or 110 negative MD is required to be shifted into the CSA–A 40 of the adder tree 21 by the gates 24. It is a well known technique to those skilled in the art of digital computers to perform subtraction by converting the subtrahend to two's complement form and adding the numbers. It is also a well known technique to convert to two's complement by first converting to one's complement, i.e., taking the inverse of the bits, and then adding one to the low order position of the number. This is the technique utilized by Goldschmidt to convert MD to negative MD whenever the multiplier decoder 32 requires that negative MD be shifted into the adder tree 21 and the HOT ONE is the binary one bit that must be added to the low order position in order to complete the conversion to two's complement form. The HOT ONE is a binary zero bit whenever the decoder 32 causes positive MD or zero to be shifted into the adder tree 21. The sum out of the adder loop 22 is fed back into the input of the second stage CSA–C. Since the outputs of CSA–C are produced at the same time that CSA–B receives its inputs, then some delay must be provided in the sum feedback loop to compensate for propagation time through CSA–B so that CSA–C will receive the outputs from CSA–B and the sum feedback simultaneously. It is the function of Buffer 51 to provide the necessary delay. CSA–C also receives at its input the HOT ONE for multiple M2.

The outputs produced by CSA–C are the sum and carry for an iteration through the multiply unit. Since six bits of the multiplier are being retired each iteration, the outputs of CSA–C must be shifted six bits in the low order direction at the end of each iteration in order to accomodate the next 6 bits of the multiplier being scanned by the multiplier select 31A. It was indicated previously that 7 bits of the multiplier are selected on the first iteration and 7 bits on the succeeding iterations by an overlapping technique. The 7th or high order bit from each iteration is reselected as the low order bit for the succeeding iteration because the decoder examines the bits in overlapping 3-bit groups. Seven bits are required to form three overlapping groups of 3 bits each, e.g., 1011100. Digits 011100 are retired during the iteration and 1 is the low order bit for the next iteration. Accordingly 6 bits of the carry-save adder loop output are shifted "right" at the end of each iteration and applied to the parallel spill bit adder 71 which has the function of calculating the sum of the applied bits and propagating a carry through each successive series of spill bits to determine if a carry will be produced by the final group of spill bits gated to the spill adder 71 at the end of the final iteration through adder loop 22. The bits added in the spill adder 71 form the low order bits of the product in the multiply operation and are stored in spill sum register 71A after each iteration pending the final iteration through the adder loop 22. Also, the HOT ONE for multiple M3 is added into the spill adder 71. Sum OR gates 90 and carry OR gates 91 gate the sums and carrys from CSA–C to the residue generator 400 after each iteration and gate the adder loop outputs together with the spill adder carry to the carry propagate adder (CPA) following the final interation to produce the high-order portion of the final product. Then the spill sum register contents are gated into the low-order portion of the product by sum OR gates 90.

The actual residue generator 400 of this invention operates in connection with the output of the adder loop 22 and the output of spill adder 71 to generate the residue of the Partial Product during each iteration. Specifically, a spill sum residue generator 410 is connected to the sum output of spill adder 71 to generate the residue of the 6 sum and 6 carry bits from CSA–C that are accumulated in spill adder 71 during each iteration and a CSA sum and carry residue generator 430 is connected to sum OR gates 90 and carry OR gates 91 to generate the residue of CSA–C output each iteration. The sign extension bits at the CSA–C output must also be ingated to the residue generator 430. The residue generators for the spill sum and CSA–C outputs are of the conventional type as heretofore described herein. The output of the spill sum residue generator 410 is connected to spill sum residue accumulator 420 wherein it is added to the previous spill sum residue. The spill sum residues must be accumulated since the spill sums are concatenated to each other and then to the carry propagate adder result after the final iteration. The final link in the actual residue generator 400 is residue adder 440. The residue adder 440 receives at its input the outputs from the spill sum residue accumulator 420 which represents the accumulated spill sum residue through the previous iteration, the CSA sum and carry residue generator 430 which represents the residue of the current iteration, and the carry output from spill adder 71 for the previous iteration. On the first iteration the output of spill sum residue accumulator 420 and the carry output of spill adder 71 are zero. The residue adder combines these inputs plus "2" to produce the generated residue. The "2" is added in the residue adder 440 to compensate for a peculiarity of the carry-save adder initialization which causes one of its outputs to always be negative. The "2" is added as previously stated to convert the negative residue to a positive residue.

The outputs of the residue predictor 200 and the actual residue generator 400 are received by residue comparator 300 wherein the residue compare 310 compares the two signals for digital equivalence and generates an error signal if the result of the comparison is unequal. The error signal thus generated may be utilized to indicate that an error has occurred during the multiply operation.

OPERATION

In normal operation, the multiplicand and multiplier, whose product is to be determined, are loaded into multiplicand source 30 and multiplier source 31 of the multiply unit 100. If either multiplicand or multiplier is negative it will be represented in two's complement form. The first iteration is initiated by iteration counter 31B and multiplier select 31A scans the first 7 bit position of the multiplier source 30 and transfers the bits to the multiplier decoder 32. The multiplier decoder 32 decodes the multiplier bits held therein in overlapping groups of 3 bits and gates the multiplicand into multiple gates 24 accordingly to determine multiples M1 through M3. More specifically, if the first 7 bits of the multiplier are 1011100 then the multiples M1 through M3 are determined as follows:

```
   M2
 1011100
 M3  M1
```

Referring to FIG. 4, for M1=100, negative MD is to be loaded directly into CSA–A 40 of adder tree 21. Therefore, the inverse (1's complement) of the multiplicand is gated through the M1 position of gates 24. For M2=111, 0 is to be loaded into CSA–A 40. Accordingly, 0 is gated through the M2 position of gates 24. For M3=101, negative MD is to be loaded into CSA–A 40 shifted right by 1 bit position and accordingly the inverse of MD is gated through the M3 position of gates 24 shifted right by 1 bit position. As described in the Goldschmidt patent, the starting bit position of multiple M2 at the input to CSA–A is 2 bit positions to the left of the starting bit position for multiple M1. Similarly, the starting bit position of multiple M3 is 2 bit positions to the left of the starting bit position of multiple M2.

Referring back to FIG. 1, the multiplicand residue generator 210 determines the residue and sign of the multiplicand source 30. The multiplicand residue and sign determined by multiplicand residue generator 210 are then received at the inputs of multiple residue generator 240 along with the decoding information from multiplier decoder 32. Referring now to FIG. 3, the residue of the multiplicand is received by the residue adjust 250 of operand residue generator 240 at input lines 251 and the sign of MD is received at input lines 252. Residue adjust 250 logically adjusts the residue of MD such that it always appears positive. For example, assume residue of MD=2, then residue adjust 250 logically combines the inputs of MD negative and MD residue equals 2 to produce a positive residue of 1 which is equivalent to adding 2 mod 3 to the residue of a negative number in two's complement form.

Still referring to FIG. 3, the decoding information from multiplier decoder 32 is received at input lines 262 of the residue generator 260 portion of multiple residue generator 240. The residue generator 260 logically combines the decoder output with the adjusted MD residue to determine the residue of the multiples M1 through M3. Accordingly in the foregoing examples wherein the decoder bits for M1=100 (load-MD directly into CSA–A) and MD adjusted residue equal 1, the residue of M1=2. Similarly, Table 2 of FIG. 5 shows a residue of 2 for an operand where residue of negative MD=2 and the decoder output requires loading −MD directly into CSA–A. The residues of M2 and M3 are similarly determined by multiple residue generator 240.

The Partial Product residue accumulator 220 receives the residues for multiples M1 through M3 at its input and combines these residues with the predicted residue for the previous iteration to determine the predicted residue for the current iteration. For the first iteration, the previously predicted residue is zero. Thereafter, as the accumulator 220 shifts its output into buffer 230, the output is also fed back to the accumulator 220 where it is added to the three multiple residues for the next iteration.

Simultaneous with generation of the predicted residue, the multiply unit 100 generates the Partial Product for the current iteration. Accordingly, the contents of gates 24 representing multiples M1 through M3 are shifted into CSA–A 40 as determined above. CSA–40 adds M1 through M3 together to produce a sum and carry at its output. CSA 50 receives at its input the output from CSA 40, feedback from the carry of CSA 52 and a HOT ONE for M1. In the above example, M1 was negative and loaded into CSA 40 in one's complement, therefore the HOT ONE for M1 is binary 1 which is loaded into the rightmost position of the carry of CSA 50. The feedback input to CSA 50 for the first iteration is 0. CSA 50 produces at its out a sum and carry representing the sum of the sum and carry from CSA 40 and the carry feedback from CSA 52. The outputs from CSA 50 are input to CSA 52 along with the sum output from CSA 52 which was delayed in buffer 51 during propagation through CSA 50 and the HOT ONE for multiple M2 which is 0 in the above example. SCA 52 adds its inputs to produce a sum and carry output. The outputs of CSA 52 are shifted right by 6 bits into spill bit adder 71 to make room for the 6 multiplier bits to be considered during the next iteration.

Concurrently with the shifting of 6 sum and 6 carry bits of the output of CSA 52 into the spill adder 71, the actual residue generator 400 is activated to determine the residue of the Partial Product produced at the output of CSA 52. Sum OR gates 90 and carry OR gates 91 are activated to gate the unshifted outputs of CSA 52, including the sign extension bits, to CSA sum and carry residue generator 430. CSA sum and carry residue generator 430 produces the residue of the sum and carry from CSA 52 and propagates this residue to residue adder 440. Residue adder 440 receives at its input the output from CSA sum and carry residue generator 430, the carry output from spill bit adder 71 and the output of spill sum residue accumulator 420 and adds these inputs plus "2" to produce the actual residue for the current Partial Product. As previously stated the "2" compensates for CSA initialization. The outputs from the spill adder carry and spill sum residue accumulator which are propagated to the residue adder represent the outputs from the previous iteration since the output of CSA sum and carry residue generator 430 is generated from the unshifted outputs from CSA–C 52. Therefore on the first iteration these two outputs are 0.

Residue compare 310 receives at its inputs the outputs of residue adder 440 and buffer 230 which represent the actual and predicted residues for the current iteration respectively. Residue compare 310 compares its inputs digitally to determine if a hardware failure has caused an error in multiply unit during the iteration under consideration. If an error has occurred, the results of the compare will be unequal and an error signal will be produced.

Concurrent with the gating of CSA 52 outputs of the CSA sum and carry residue generator 430 by sum OR gates 90 and carry OR gates 91, 6 sum and 6 carry bits of the Partial Product are shifted from CSA 52 into spill adder 71. Spill adder 71 receives these bits at its inputs together with feedback from its own carry bit and the HOT ONE for M3 and adds them together to produce a sum and carry output. The sum output of spill adder 71 is shifted into spill sum register 71A where it is concatenated with spill sums from previous iterations. The sum output of spill adder 71 is also sampled by spill sum residue generator 410 which determines the residue of the spill sum. The output of spill sum residue generator 410 is propagated to spill sum residue accumulator 420 wherein it is added to the accumulated residue of the spill sum for previous iterations. The output of the spill sum residue accumulator 420 is propagated to residue adder 440 where it is added to the Partial Product residue for the next iteration. The carry output of spill adder 71 is propagated directly from the spill adder output to residue adder 440 since it is only a 1 bit signal and it also is added to the Partial Product residue for the next iteration.

After the final iteration through the adder loop 22 the outputs of CSA 52 are gated by sum OR gates 90 and carry OR gates 91 to the CPA together with the HOT ONE for multiple M3 for the final iteration and the spill adder carry. These inputs are combined by the CPA to form the most significant digits of the final product. The output of spill sum register 71A is then gated into the CPA by sum OR gates 90 to form the least significant digits of the final product.

There has been shown in the previous description error checking circuitry constructed to determine if a hardware error has occurred during each iteration through an iterative addition multiply unit executing a multiply wherein 2 bits of the multiplier are decoded into one decoded bit for determination of the proper shifts and sign of the multiplicand into a 3 input carry sum adder. The checking circuit performs its task in parallel with the actual multiply operation without degradation to the efficiency of the multiply unit.

While the invention has been particularly shown and described with reference to the preferred embodiment thereof, it will be understood by those skilled in the art that various changes in form and detail may be made therein without departing from the spirit and scope of the invention.

What is claimed is:

1. Apparatus for detecting hardware errors in an iterative addition multiply unit of a digital computer wherein the operands for the multiply unit are determined by decoding a plurality of multiplier bits during each iteration comprising:

residue prediction means operating concurrently with said multiply unit including (a) residue generating means having a first input connected to said multiply unit for receiving the multiplicand bits therefrom and a second input connected to said multiply unit for receiving the decoded multiplier bits for the current iteration therefrom, said residue generating means operating on said multiplicand bits and decoded multiplier bits to generate current multiple residues, and (b) accumulator means connected to said residue generating means for combining said current multiple residues with the predicted residue for the previous iteration to yield the current predicted residue;

residue generator means connected to the output of said multiply unit for determining the actual residue of the partial product generated by the multiply unit for the current iteration; and comparator means connected to said residue prediction means and said residue generator means for comparing the predicted residue with the actual residue and producing an error signal when the result of the compare is unequal.

2. Apparatus according to claim 1 wherein said residue generating means further comprising:

a first residue generator means connected to said first input for determining the residue of the multiplicand; and a second residue generator means connected to said second input and to said first residue generator means for determining the residues of the current multiplies to the multiply unit.

3. The apparatus according to claim 2 wherein said second residue generator means comprises:

residue adjust means for adjusting the residue of the multiplicand to convert it to positive, and operand residue generating means connected to said residue adjust means for generating the residues of the current multiples to the multiply unit based on the adjust multiplicand residue and the decoded multiplier bits for the current iteration.

4. The apparatus according to claim 3 wherein said residue prediction means further comprises a buffer means connected to said accumulator means and said comparator means for delaying the current predicted residue until the current actual residue is produced.

5. Apparatus for detecting hardware errors in an iterative addition multiply unit of a digital computer wherein the multiples for the multiply unit are determined by decoding a plurality of multiplier bits during each iteration comprising:

residue prediction means operating concurrently with said multiply unit for generating a predicted residue for partial product obtained during the current iteration, said residue prediction means including a first residue generating means connected to said multiply unit for determining the residue of the multiplicand, a second residue generating means connected to said multiply unit and to said first residue generating means for determining the residue of the current multiples to the multiply unit based on the multiplicand residue and the decoded multiplier bits, accumulator means connected to said second residue generating means for combining the current operand residues with the predicted residue for the previous iteration to yield the current predicted residue, and buffer means connected to the accumulator means for delaying said current predicted residue until the actual residue is produced;

residue generator means connected to the output of said multiply unit for determining the actual residue of the partial product generated by the multiply unit; and comparator means connected to said residue prediction means and said residue generator means for comparing the predicted residue with the actual residue and producing an error signal when the result of the compare is unequal.

* * * * *